US008705725B1

(12) United States Patent
Zettner

(10) Patent No.: US 8,705,725 B1
(45) Date of Patent: *Apr. 22, 2014

(54) MEMBER-INITIATED OUTBOUND CALL

(75) Inventor: Steven D. Zettner, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,193

(22) Filed: Jul. 31, 2012

Related U.S. Application Data

(63) Continuation of application No. 11/395,093, filed on Mar. 31, 2006, now Pat. No. 8,233,611.

(51) Int. Cl.
   *H04M 3/00* (2006.01)
(52) U.S. Cl.
   USPC .................................. 379/266.07; 379/210.01
(58) Field of Classification Search
   USPC ......................................... 379/266.07, 210.01
   See application file for complete search history.

(56) References Cited

U.S. PATENT DOCUMENTS

| 5,185,782 | A | 2/1993 | Sinivasan |
| 5,627,884 | A | 5/1997 | Williams et al. |
| 6,563,921 | B1 | 5/2003 | Williams et al. |
| 6,754,334 | B2 | 6/2004 | Williams et al. |
| 6,879,683 | B1 | 4/2005 | Fain et al. |
| 6,885,741 | B1 | 4/2005 | Puckett et al. |
| 7,746,999 | B2 | 6/2010 | Williams et al. |
| 2002/0085705 | A1 | 7/2002 | Shires |
| 2003/0174830 | A1 | 9/2003 | Boyer et al. |
| 2003/0177017 | A1 | 9/2003 | Boyer et al. |
| 2004/0120484 | A1 | 6/2004 | Buzbee |
| 2004/0203660 | A1 | 10/2004 | Tibrewal et al. |
| 2005/0182672 | A1 | 8/2005 | Hemm et al. |
| 2006/0256949 | A1 | 11/2006 | Noble, Jr. |

OTHER PUBLICATIONS

Anton, J., et al. The Impact of Automated Return-Call Systems, "A Real-World Case Study", Purdue University, Mar. 2003, 38 pgs.

*Primary Examiner* — Creighton Smith
(74) *Attorney, Agent, or Firm* — Brooks, Cameron & Huebsch, PLLC

(57) ABSTRACT

A system and method employed in a call center provide a memory structure for use in maintaining a call queue including data representing a plurality of calls to be serviced, and the data is structured so as to represent an order in which the plurality of calls are to be serviced. The call queue data further indicates whether each call is to be handled as an inbound or an outbound call. When an incoming call is received by the call center and no service representative is currently available to service the call, the caller is prompted to elect to either wait on-line for a next available service representative or to disconnect the call and receive a call back at a later time. An aspect of this technology is that the caller does not lose his or her place in the queue and is not stuck on hold.

20 Claims, 3 Drawing Sheets

MEMBER-INITIATED OUTBOUND CALL

CROSS-REFERENCES TO RELATED APPLICATIONS

This application is a continuation of U.S. patent application Ser. No. 11/395,093, filed Mar. 31, 2006, now U.S. Pat. No. 8,233,611, which is herein incorporated by reference.

TECHNICAL FIELD

The subject matter described herein relates generally to telecommunications, and more particularly to technology employed in a call center to offer an improved caller experience during periods of heavy call volume. This technology is particularly suited, but by no means limited, for use by businesses in the financial services or like industry, where customer satisfaction is very important. Illustrative embodiments of this technology permit a caller to hang up the phone but maintain his/her place in a call queue during periods of heavy call volume.

BACKGROUND

A "call center" is the part of an organization that handles inbound and outbound communications with customers or members. Call centers often experience inbound calling queues where callers are placed on-hold until a service representative, or sometimes called a member service representative (MSR, i.e., where the call center serves an organization having members to be serviced), can attend to them. This is problematic for businesses, such as member service organizations, whose goal is to achieve extremely high customer or member satisfaction. (The terms "customer" and "member" are sometimes used interchangeably in this specification.) This is especially problematic in situations where hold-time is perceived negatively by callers. Approaches to solving this problem have included: (a) providing additional staff to service customers during high call volume; (b) driving customers to self-service facilities, such as those provided by a web server (this may include both driving traffic there by suggesting it with a voice instruction as well as generally encouraging that channel through other non-concurrent means); and (c) providing automated systems that "distract" the caller, e.g., with music or other entertainment.

The costs of maintaining a call center include the salary and benefits paid to employees. In an effort to reduce such costs, improved efficiency may require that a call center be staffed such that there is an insufficient number of service representatives on duty during periods of peak call volume, which in turn can result in callers having to wait long periods before speaking with a service representative. To address this and other issues, call centers today may attempt to move calls from a live agent into a self-service channel. This is illustrated in FIG. 1 and discussed below.

Customers calling into automated call centers are typically directed to standard speech recognition applications and hence all customers may hear the same call flows and options. This model can be inefficient in that a customer may be required to listen to all the standard call flows and options even if the particular customer does not need these. This results in increased call durations, which leads directly to increased costs per call. The use of standard call flows and options also waste other resources as well as the customer's time. Standard call flows and options are also impersonal to the caller and hence caller satisfaction is reduced. As a result, some callers tend to disfavor automated call centers and prefer to speak in person to a live call center service representative. Accordingly, there is a need to improve the caller experience achieved by automated call centers in which a live service representative speaks to individual callers.

A common approach to operating a call center is depicted in FIG. 1. As shown, the incoming call is received, step 10, and will be either delivered to the least occupied or highest skilled agent (or MSR), step 12; or else, if all representatives are busy, the call will be placed in a queue, steps 14-26. The system will typically determine whether the estimated wait time (EWT) is less than a prescribed value (say, 60 seconds), step 14, and then play a selected announcement depending on the EWT.

For example, if the EWT is less than 60 seconds, a first delay announcement is played: "At the present time all representatives are assisting other callers. Please remain on the line for the next available representative." (Step 16.) Alternatively, if the EWT is equal to or greater than 60 seconds, the system may play the following announcement: "At the present time all representatives are assisting other callers. Your approximate wait time is XX minutes." (Step 18. In this example, XX represents the current EWT in minutes.) Following the playing of the EWT announcement, the system may then suggest that the caller try an alternative channel, i.e., a related website, and then follow this by playing music for a period of time (e.g., 60 seconds). (Steps 20, 22.) This may then be followed by a second delay announcement (step 24) and another period of music playing, step 26, as shown in FIG. 1.

The process described above and depicted in FIG. 1 is fairly common and can be acceptable in some situations. However, there is room for improvement in this process, particularly where it is deemed to be necessary or desirable to reduce the amount of time the caller is required to wait on the phone before speaking with a service representative.

One approach to improving call center customer experience involves the use of so-called Virtual Hold Technology. See, e.g., the document entitled *The Impact of Automated Return-Call Systems, "A Real-World Case Study"*, by Dr. Jon Anton, et al. (March 2003), a copy of which is being submitted with an Information Disclosure Statement (IDS) filed herewith. See also www.virtualhold.com. This technology permits callers to hang up the phone while maintaining their place in line (i.e., in the call queue). The call center returns the customer's call, purportedly in the same amount of time as if the caller had waited on hold. Moreover, the above-cited case study discloses that an "ideal system" should:

1. Interface with the automatic call director (ACD) to: (a) monitor and record the length of time that a call waits in queue before being answered; and (b) seize the call when the actual wait time exceeds a predetermined threshold.
2. Include an interactive voice response system (IVR) to: (a) inform the caller of the predicted wait time to reach a customer service representative (CSR); (b) offer the caller the option to: (i) remain on hold; (ii) place a request to the call center for a return call when a CSR is available; or (iii) schedule a request for a return call by a CSR at a more convenient time for the caller; (c) return the call to the ACD queue if the caller declines the return-call offer; (d) capture the caller's contact information and return telephone number if the caller elects to receive a return call; and (e) register the time the caller requests a return call to occur.
3. Provide an interface with the computer telephony integration (CTI) server to capture required information about the caller;

4. Ensure no functionality is lost when the return call occurs and the call is released to a CSR;
5. Include an automatic dialer to: (a) dial the caller's telephone number at the time scheduled for the return call to occur; (b) monitor the call progress tones to determine when the placed call is answered; (c) determine when the person who placed the initial call is on the phone; (d) transfer the call to the ACD to be answered by the next available CSR; and (e) follow business rules established by call center management when the return call does not reach the customer who originally placed the call. These rules can include an attempt to place the call again later, or leave a recorded message for the customer to call back.
6. Contain an administrative and reporting system that includes: (a) a real time monitor showing the current state of both the ACD and automated return-call system queues; (b) a comprehensive and customizable historical reporting subsystem; (c) easy to use administrative tools to configure and change settings and control options, and optimize system performance.

A goal underlying the technology described herein is to provide an alternative method and system for managing a call queue in order to provide member-initiated outbound calling.

SUMMARY

An illustrative embodiment of a system employed in a call center provides a memory structure for use in maintaining a call queue. The call queue includes data representing a plurality of calls to be serviced by a service representative, and the data is structured so as to represent an order in which the plurality of calls are to be serviced. The call queue data further indicates whether each call is to be handled as an inbound or an outbound call. When an incoming call is received by the call center and no service representative is currently available to service the call, the caller is prompted to elect to either wait on-line for a next available service representative or to disconnect the call and receive a call back at a later time. In response to the caller's election to receive a call back, the system writes information into the call queue to indicate the first caller's election to receive an outbound call from the next available service representative. An aspect of this technology is that the caller does not lose his or her place in the queue and is not stuck on hold. The caller's cell phone minutes and/or time are not wasted, the caller is not subjected to boring music, and other aspects that contribute to a negative experience are avoided.

One feature can be an option for the customer/member to remain on hold after entering his/her phone number and disconnect at any time while continuing in the queue. In addition, and for certain cases when available, DNIS (Dialed Number Identification Service) could be used to ascertain the phone number from which the member is calling and can be used to prompt the member to either use that number (read back to the member) or allow the member to enter an alternative number.

Other aspects are described below.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
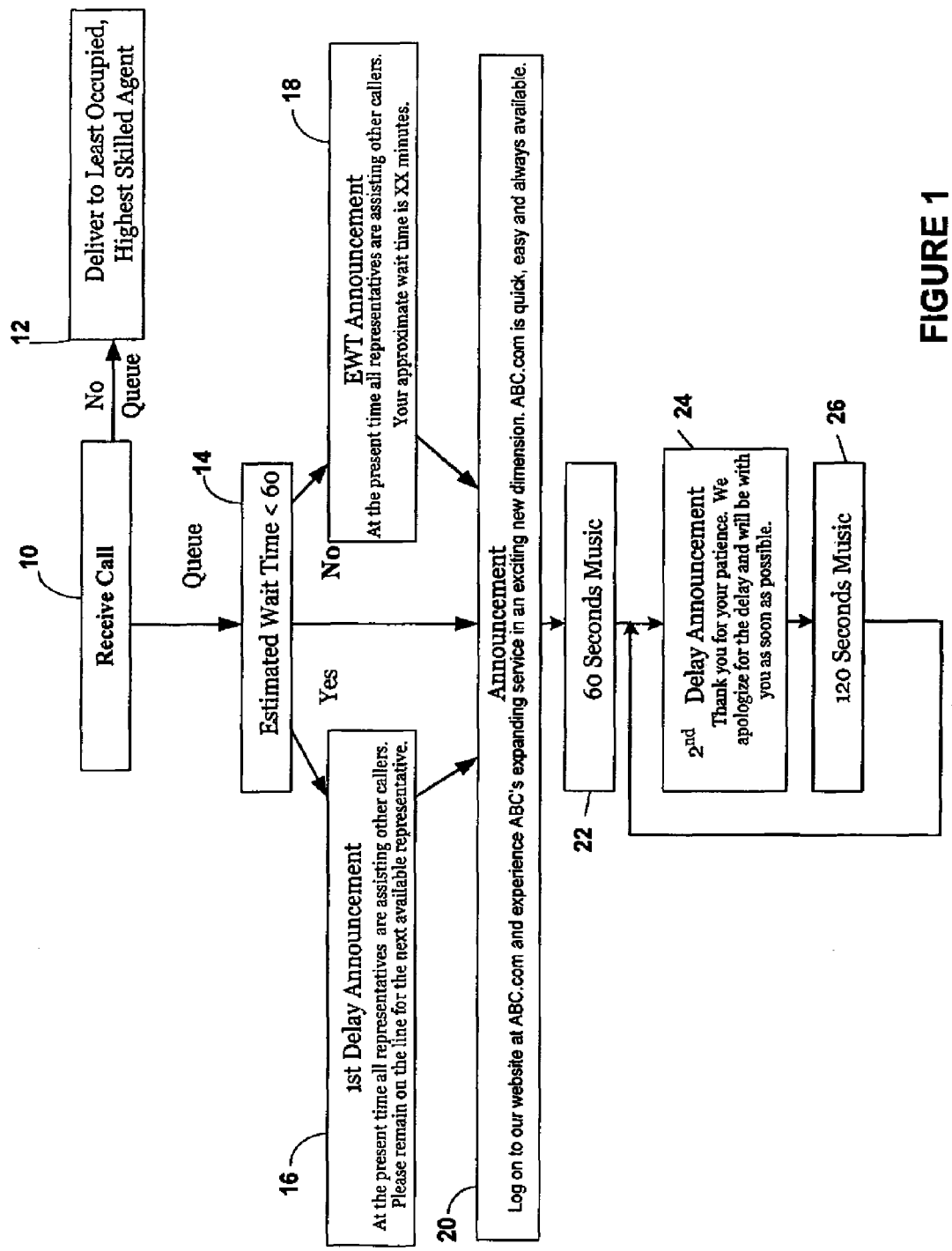
FIG. 1 is a flowchart depicting a known approach to handling calls to a call center when all representatives are busy.
Figure 2:
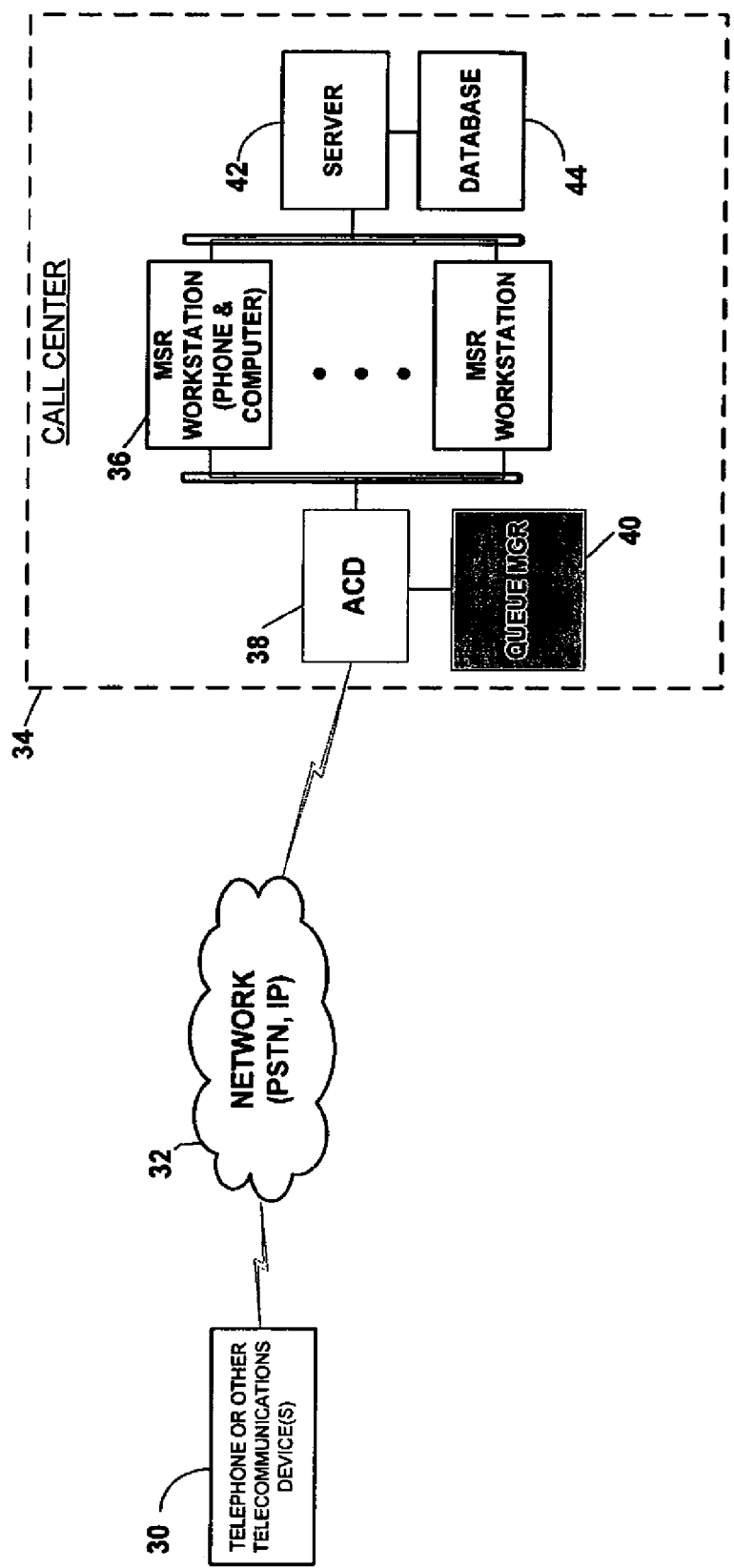
FIG. 2 schematically depicts the architecture of a call center employing an illustrative embodiment of the innovation described herein.

FIG. 2 schematically depicts an illustrative embodiment of a call center environment in which the present innovation may be employed. As shown, a telephone or other telecommunications device 30 may be coupled via a network 32 to the call center 34. The telecommunications device 30 may be a land line telephone, a mobile/wireless telephone, a computer and/or a hand-held device such as a wireless-enabled PDA (personal digital assistant), or the like. The network 32 may include a PSTN (public switched telephone network), a wireless communications network, or a digital computer network such as the Internet or private intranet, or the like.

The architecture of the call center 34 is illustrative, and the present innovation is not limited to the particular structure shown in FIG. 2. As shown, the call center includes one or more MSR workstations 36 (each including a telephone and computer), an automatic call distribution (ACD) system 38, a queue manager 40, a server computer 42 and a database 44.

ACD systems 38 are well known, and typically provide a computerized phone system that routes incoming and outgoing telephone calls to the next available operator, agent or service representative. The ACD typically responds to the caller with a voice menu and connects the call to an appropriate individual. In the system of FIG. 2, the ACD is operatively associated with a queue manager 40, which is a software-based system that operates as described below and illustrated in FIG. 3. Queue management has been known to entail various functions, including: (a) creation of a number of customer service queues to determine how incidents flow through the system; (b) definition of routing rules for each customer service queue to automate how calls are handled, ensuring high-priority calls are dealt with first; (c) allocation of roles and users to work on queues that optimize skills-matching and deployment; and (d) definition of permissions within customer service automation queues to complete ad-hoc routing and management overrides. These are known functions and are not intended to define or limit the scope of the present innovation. Rather, the present innovation relates to the function of permitting the caller to maintain his place in the queue even if he disconnects from the call. This is discussed below in connection with FIG. 3.

Figure 3:
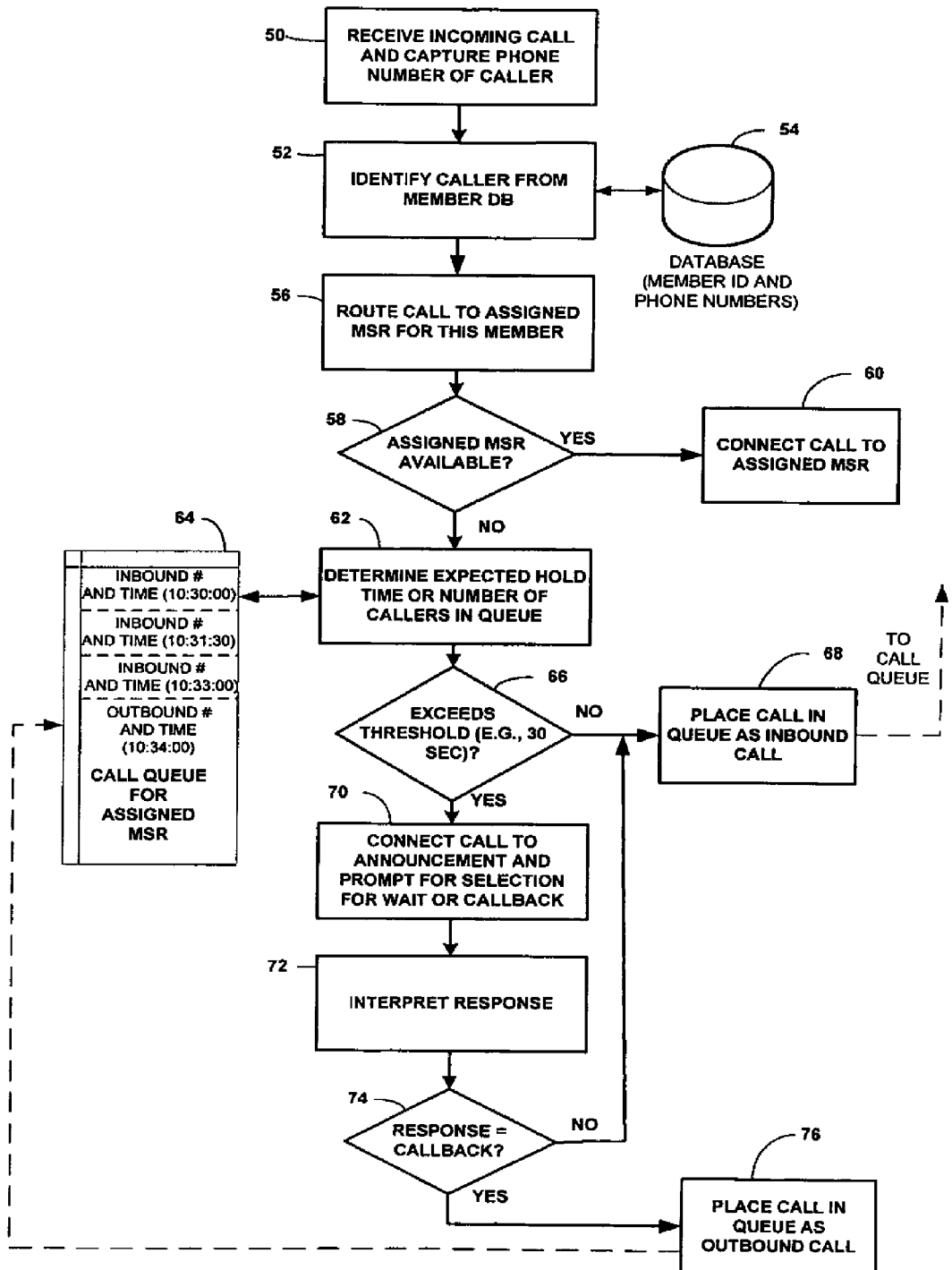
FIG. 3 is a flowchart of an approach to handling calls in accordance with an exemplary embodiment of the innovation described herein.

FIG. 3 is a flowchart illustrating one exemplary embodiment of a member initiated outbound call process. As shown, at step 50, an incoming call is received and the caller's phone number is captured using known methods. At step 52, the name and other pertinent information about the caller are extracted from a database 54. Then, at step 56, the call may be routed to an assigned MSR for this particular member, assuming that sufficient information is contained in the database or other pre-determined rules have been established for this member. If there is no pre-assigned MSR for this member, then an available MSR is selected to service the call.

At step 58, the system determines whether the assigned MSR is available. If so, at step 60 the caller is connected to this assigned MSR. If the assigned MSR is not available, at step 62 the system determines the expected hold time (or number of callers) in the call queue 64, as shown. The call queue 64 may be a queue for the particular assigned MSR, or it may be a global queue for all MSRs in the event that the system does not employ the capability of assigning calls to specific MSRs based on member ID.

At step 66, the system determines whether the expected hold time exceeds a pre-determined threshold, e.g., 30 seconds. If not, the call may be placed in the call queue as an inbound call at step 64. If the expected hold time does exceed the pre-determined threshold, at step 70 the system connects the call to an announcement and prompts for the caller to select to either wait or instead to hang up and receive a call back. In this regard, it is also possible for the caller to elect to wait, but then during the wait decide to hang up. In this event, the caller could still be called back if the system has captured a call back number for this caller.

At step 72, the system interprets the caller's response, and at step 74 branches to either step 68 or step 76. As discussed previously, at step 68, the branch taken if the caller elects not to receive a call back, the call is placed in queue as an inbound call. Alternatively, at step 76, the call is placed in queue as an outbound call, as shown in FIG. 3.

There are various specific ways in which the call queue 64 may be implemented. One example is illustrated in FIG. 3, which depicts several calls represented in the queue as inbound calls. The data included in the queue could include the inbound calling number and time the call was received. In the example shown in FIG. 3, the fourth call in the queue is represented in the shaded area of the box and is denoted as an outbound call. In this case, the outbound calling number, i.e., the call back number for this caller, is recorded along with the time the call is received.

The following table depicts an alternative implementation of a call queue having data structures for supporting member initiated outbound calling as described herein. The first column in the table contains a one-bit flag (1 or 0) to indicate whether the call is inbound or outbound, i.e., a value of 1 indicating that the call is inbound and a value of 0 indicating that the call is not inbound. The next column contains a similar flag, and since the two flags are complements of one another they are in a sense redundant but nevertheless included in this example for the purpose of clearly depicting that the respective rows identify each call as either inbound or outbound. The third column contains a phone number, either of a service representative (for inbound calls) or a customer/member (for outbound calls). This is the number the ACD will dial when the call rises to the top of the queue. Finally, the fourth column contains the time that the call was received. As shown, the typical rule to be followed is that the calls in the queue are ranked in the order received, i.e., the earliest received calls are at the top of the queue. Another way of stating this is "first-in first-out."

| ILLUSTRATIVE CALL QUEUE | | | |
|---|---|---|---|
| INBOUND | OUTBOUND | NUMBER | TIME |
| 1 | 0 | xxx-xxx-xxxz | 10:30:00 |
| 1 | 0 | xxx-xxx-xxxz | 10:31:30 |
| 0 | 1 | xxx-xxx-xxxz | 10:32:00 |
| 1 | 0 | xxx-xxx-xxxz | 10:33:00 |

Accordingly, when the ACD system 38 (FIG. 2) is working its way through the call queue 64, as directed by the queue manager 40, it is able to identify outbound calls and automatically dial the outbound call back number and connect an MSR to the customer/member when he or she answers the phone.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for use in a call center, comprising:
   receiving an incoming call from a caller;
   determining that a service representative is not available to service the incoming call;
   placing the incoming call in a call queue;
   receiving an election from the caller to receive a call back from a next available service representative;
   permitting the caller to remain on-line after receiving the election to receive the call back from the next available service representative and to disconnect the incoming call before being serviced by the next available service representative while maintaining a position in the call queue; and
   responding to the disconnect by indicating in the call queue that the incoming call is to be treated as an outbound call by the next available service representative.

2. The method of claim 1, wherein the method includes automatically determining a phone number to associate with the caller.

3. The method of claim 2, wherein the method includes extracting a caller name from a database based on the phone number associated with the caller.

4. The method of claim 1, wherein the method includes placing the outbound call to the caller.

5. The method of claim 4, wherein the method includes placing the outbound call at a time the next available service representative is available to service the caller.

6. The method of claim 5, wherein the method includes placing the outbound call when the call queue indicates that no other calls have priority over the incoming call.

7. The method of claim 4, wherein the method includes placing the outbound call within a period of time that is approximately the same as a time period that the caller would have had to wait on-line for the next available service representative.

8. The method of claim 1, wherein the method includes servicing a second incoming call represented in the call queue as having been received by the call center prior to time of receiving the incoming call.

9. The method of claim 1, wherein the method includes routing the incoming call to a service representative that has been pre-assigned to the caller.

10. The method of claim 1, wherein the method includes providing a call queue that:
- includes a telephone number associated with the service representative when the caller elects to hold for the next available service representative; and
- includes a telephone number associated with the caller when the caller elects to receive the call back from the next available service representative.

11. A non-transitory computer-readable medium having computer-executable instructions stored thereon that are executed by a processor to:
- receive an incoming call from a caller;
- determine that a service representative is not available to service the incoming call;
- place the incoming call in a call queue;
- receive an election from the caller to receive a call back from the next available service representative;
- permit the caller to remain on-line after receiving the election to receive the call back from the next available service representative and to disconnect the incoming call before being serviced by the next available service representative while maintaining a position in the call queue;
- respond to the disconnect by indicating in the call queue that the incoming call is to be treated as an outbound call by the next available service representative; and
- place the outbound call at the time the next available service representative is available to service the caller.

12. The non-transitory computer-readable medium of claim 11, including instructions executed to store a telephone number associated with the service representative when the caller elects to hold for the next available service representative.

13. The non-transitory computer-readable medium of claim 11, including instructions executed to store a telephone number associated with the caller when the caller elects to receive the call back from the next available service representative.

14. The non-transitory computer-readable medium of claim 13, including instructions executed to automatically dial the telephone number associated with the call and connect the next available service representative when the call rises to a top of the queue.

15. A system, comprising:
- a processor;
- a memory storing computer-readable instructions, the computer-readable instructions executable by the processor to:
  - receive an incoming call from a caller;
  - determine that a service representative is not available to service the incoming call;
  - place the incoming call in a call queue and determine an expected hold time;
  - receive an election from the caller to receive a call back from a next available service representative in response to the expected hold time exceeding a predetermined time threshold;
  - permit the caller to remain on-line after receiving the election to receive the call back from the next available service representative and to disconnect the incoming call before being serviced by the next available service representative while maintaining a position in the call queue;
  - respond to the disconnect by indicating in the call queue that the incoming call is to be treated as an outbound call by the next available service representative; and
  - place the outbound call when the call queue indicates that no other calls have priority over the incoming call.

16. The system of claim 15, wherein a determination of whether a particular service representative has been assigned to the caller making the incoming call is made.

17. The system of claim 16, wherein the incoming call is placed in a call queue for a service representative assigned to the caller when a determination is made that the particular service representative has been assigned to the caller.

18. The system of claim 16, wherein the incoming call is placed in a call queue for the next available service representative when a determination is made that the particular service representative has not been assigned to the caller.

19. The system of claim 15, wherein the caller is prompted, in response to the expected hold time exceeding a time threshold, to elect to either wait on-line for a next available service representative or to disconnect the incoming call and receive a call back from the next available service representative.

20. The system of claim 15, wherein one or more incoming calls represented in the call queue are serviced as having been received by the call center prior to the time of receiving the incoming call.

\* \* \* \* \*